US005530449A

United States Patent [19]

Wachs et al.

[11] Patent Number: 5,530,449

[45] Date of Patent: Jun. 25, 1996

[54] PHASED ARRAY ANTENNA MANAGEMENT SYSTEM AND CALIBRATION METHOD

[75] Inventors: Marvin R. Wachs, Calabasas; Arnold L. Berman, Los Angeles; James D. Thompson, Manhattan Beach, all of Calif.

[73] Assignee: Hughes Electronics, Los Angeles, Calif.

[21] Appl. No.: 342,541

[22] Filed: Nov. 18, 1994

[51] Int. Cl.[6] .................................................. G01S 7/40

[52] U.S. Cl. .................................................. 342/174; 342/372

[58] Field of Search .................................. 342/372, 173, 342/174, 360

[56] References Cited

U.S. PATENT DOCUMENTS

| | | | |
|---|---|---|---|
| 5,083,131 | 1/1992 | Julian | 342/372 |
| 5,093,667 | 3/1992 | Andricos | 342/372 |
| 5,412,414 | 5/1995 | Ast et al. | 342/174 |

*Primary Examiner*—Theodore M. Blum

*Attorney, Agent, or Firm*—Terje Gudmestad; W. K. Denson-Low

[57] ABSTRACT

A management system and calibration method for use with a phased array antenna that increases its robustness to component changes or failures. The present invention employs a system level measurement of amplitude and phase, conducted during nodal operation, to determine on an element by element basis, the tracking performance of individual chains that for the antennas. This amplitude and phase information is employed to compensate the each chain for the measured error. The present system and method measures the amplitude and phase of individual element chains utilizing probe carriers. The required correction coefficients for each chain is determined from the measured amplitude and phase data, and each individual element chain is individually compensated to remedy the amplitude and phase errors. The present system and method generates a probe carrier that is applied to each element chain along with normal communication signal waveforms. The probe carrier is sufficiently small (narrow bandwidth, low power, or encoded) so that it does not significantly degrade system operation. The relative amplitude and phase of the probe carrier, as applied to an element chain, is measured. By switching the probe carrier in time sequence between each chain, the differential amplitude and phase characteristics of each of the chains is determined. This also serves to detect component failures in a chain. Each chain includes commandable amplitude and phase weighting networks. Once the differential amplitude and phase tracing characteristics of the antenna re characterized, the individual weighting networks are commanded to settings that compensate for the measured values.

6 Claims, 3 Drawing Sheets

PHASED ARRAY ANTENNA MANAGEMENT SYSTEM AND CALIBRATION METHOD

BACKGROUND

The present invention relates to phased array communication systems, and more particularly, to a phased array antenna management system and antenna calibration method for use with a phased array communication system.

Increasing system performance requirements placed on future communications satellite systems, for example, require the application of active phased array technology either as a complete antenna or as a feed for a reflector type antenna system. Active phased arrays include passive antenna radiating elements and associated chains of electronic elements including amplifiers, filters and frequency translators. Each of these components is subject to individual transfer function variation, or failure, over a mission's life.

Using conventional approaches, these effects are minimized by designing each component in an element chain to closely track all of the other chains over the full range of environment and life. In high performance systems, tight tracking performance is a major cost driver. In addition, unforeseen component changes can result in uncompensatable system degradations. The conventional approach for addressing component failure is to include a sufficient number of redundant components. Detection and identification of a failed element chain may not always be practical for satellite payloads. Also, fault detection circuitry can add significant cost and complexity to the design.

A further weakness of conventional approaches applicable to space systems, is potential degradation due to initial system deployment imperfections. One example of this is a mechanical misalignment between different sections of a multi-panel phased array. Potential system performance degradation therefore results since calibration and compensation at an individual element level is impractical.

Thus, it is an objective of the present invention to provide a management system and calibration method for use with a phased array communication system that overcomes the limitations of conventional approaches for controlling component failures.

SUMMARY OF THE INVENTION

In order to meet the above and other objectives, The present invention provides for a phased array antenna management system and method for use with a phased array communication system. The phased array communication system comprises transmit and receive phased array antennas that each include a plurality of antenna element chains, wherein each chain comprises an amplitude adjustment network, a phase adjustment network, amplifiers, filters and frequency translators, as required, and an antenna element. Each chain has a desired amplitude and phase relationship with respect to the other chains of each of the antennas. The system comprises a probe carrier source for generating a probe carrier signal that is orthogonally processed by each antenna element chain. Means is provided for determining the amplitude and phase produced by each chain of the transmit and receive phased array antennas in response to the probe carrier signal, for comparing the amplitude and phase produced by each chain to the desired amplitude and phase for each chain, and for generating corrective weighting coefficients for chains that do not have the desired amplitude and phase. Means is provided for applying the corrective weighting coefficients to the amplitude and phase adjustment networks of each chain of the transmit and receive phased array antennas to produce the desired amplitude and phase relationship therebetween.

A method of calibrating transmit and receive phased array antennas of a phased array communication system, wherein respective antenna element chains comprising each of the antennas have a desired amplitude and phase relationship with respect to each other comprises the following steps. A noninterfering probe carrier is processed through each antenna chain of the transmit and receive antennas. The respective phases and amplitudes of the processed probe carriers are compared to provide a map of differential amplitudes and phases of each antenna chain of the respective transmit and receive antennas. Corrective weighting coefficients for chains that do not have the desired amplitude and phase are generated. The corrective weighting coefficients are then applied to each chain of the transmit and receive antennas to produce the desired amplitude and phase relationship therebetween.

The present invention provides for a phased array antenna management system and calibration method that may be employed with a phased array antenna, and which increases robustness of the phased array antenna to component changes or failures. Phased array antennas are subject to performance degradation due to mistracking between active and passive components making up individual chains that form the array. The present invention employs a system level measurement, conducted during normal operation, to determine on an element by element basis, the actual tracking performance of each individual chain. This information is then employed to compensate the each chain for the measured error. The present system does not require interruption of service to perform its function.

The present invention provides for the integration of various components into a novel phased array antenna management system. The phased array antenna system comprises a plurality of parallel radiating element chains that operate in phase to meet overall performance requirements of the system. A means and method for measuring the real-time performance (amplitude and phase) of individual elements utilizing added test (calibration) carriers is provided by the present invention. An earth calibration station or a processor onboard the satellite employs an algorithm for determining required correction coefficients for each chain, and a means for compensating individual element chain for errors in amplitude and phase are also provided.

The present invention improves on the shortcomings of conventional approaches. A nondisturbing measurement process is performed to characterize the performance of the transmit and receive antenna arrays. The system generates a noninterfering probe RF carrier that is applied to each element chain of an antenna array simultaneously with the normal signal waveform. The probe carrier is sufficiently small (narrow bandwidth, low power, encoded, or outside the utilized frequency band) so that it does not significantly degrade system operation. The relative amplitude and phase, of the probe carrier, as applied to an element chain, is accurately measured at an receiving terminal. By switching the probe carrier, in time sequence, between multiple element chains, for example, the differential amplitude and phase characteristics of each of the array elements is determined. This process also serves to detect component failures in each chain. Each chain includes a commandable amplitude and phase weighting network. The desired amplitude and phase differential relationships are determined by antenna beam pointing and shaping requirements. Element to element mistracking, however, modifies the required weighting commands. Once the differential amplitude and phase tracking characteristics of the operating antenna are characterized, the individual weighting networks are commanded to settings that compensate for the measured values.

The present system provides an accurate measurement of real-time system performance. Since variations in individual chains can be compensated over the life of a mission, the requirements for individual component tracking accuracy are reduced. This provides a significant cost saving. In the event of element failure, the present system permits the array to be reoptimized to minimize the performance impact of the failure. The present invention thus uses the system to solve component level problems, such as those occurring in the transmit and receive antenna chains of the transmit and receive phased array antennas.

The present invention may be employed with satellites incorporating active phased array antennas, such as mobile satellite systems including AMSC, INMARSAT P21, REGIONAL ASIA MOBILSAT, and AFRICOM, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
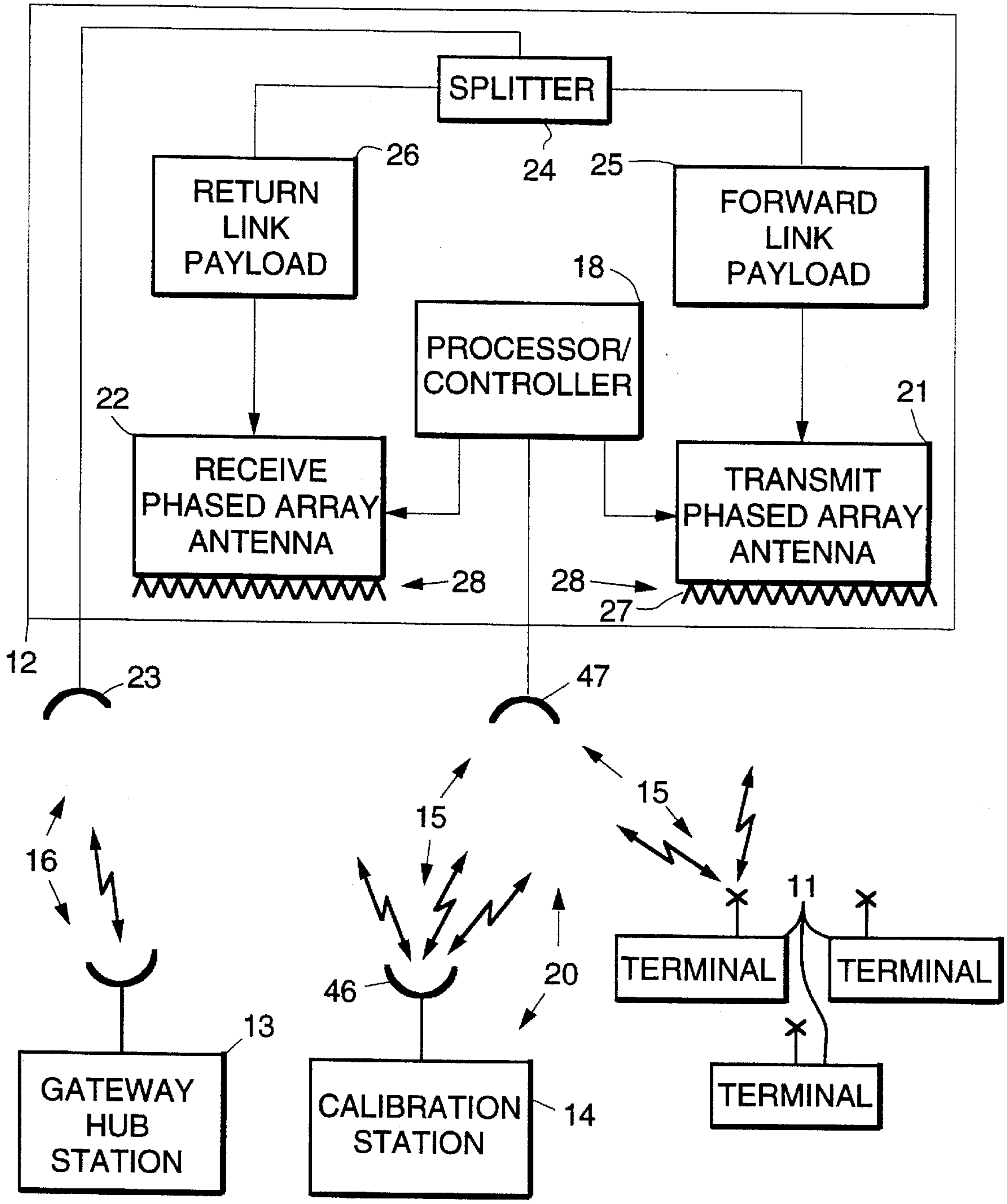
FIG. 1 illustrates a typical phased array-based communications satellite system employing a phased array antenna management system in accordance with the principles of the present invention.

Referring to the drawing figures, a typical phased array-based communications satellite system 10 is shown for illustrative purposes with reference to FIG. 1 that employs a phased array antenna management system 20 and calibration method 50 in accordance with the principles of the present invention. The communications satellite system 10 is comprised of a plurality of user mobile terminals 11, a satellite 12, a gateway hub station 13, and a calibration station 14. A mobile communications link 15 from the satellite 12 to the user mobile terminals 11 is provided at S band, for example, while a gateway communications link 16 from the satellite 12 to the gateway hub station 13 is at Ka band, for example. The S band mobile communications link 15 is also used to provide communications between the calibration station 14 and the satellite 12.

As shown in FIG. 1, the satellite 12 comprises a transmit (forward) phased array antenna 21, and a receive (return) phased array antenna 22, that service the mobile communications link 14 between the calibration station 14, the satellite 12 and the mobile terminals 11. A feeder antenna 23 that operates at Ka band, for example, is provided that may use a gimbaled reflector, for example, to service the gateway communications link 16 between the satellite 12 and the gateway hub station 13. A transmit link payload 25 and a receive link payload 26 are respectively coupled between the transmit and receive phased array antennas 21, 22 and the feeder antenna 23 by way of a power splitter 24. A transmit and receive link payloads 25, 26 comprise control and processing electronics and maneuvering systems required for operation of the satellite 12.

With regard to both the transmit and receive paths (feeder antenna 23, power splitter 24, receive link payload 26 and receive phased array antenna 22; feeder antenna 23, power splitter 24, transmit link payload 25 and transmit phased array antenna 21), a phased array beam forming function is performed on the satellite 12 by a digital processor 18, or controller 18, that forms part of the respective transmit and receive link payloads 25, 26. The amplitude and phase control function performed by the processor 18 is routine in the art and will not be described in detail herein. Signals are provided by the controller 18 that independently control the amplitude and phase drive to each of the array elements 28 of the transmit and receive phased array antenna 21, 22 in response to signals generated by the system 20 and method 50. The processor 18 may also perform processing necessary to compute correction terms in accordance with the present method 50.

The various specific embodiments of the present invention that are detailed below typically depend upon where correction factors are computed, for example. For example, in one embodiment, signals are transmitted from the satellite to the calibration station 14 to calibrate the transmit path while signal are transmitted from the calibration station 14 to the satellite 12 to calibrate the receive path. If a self-contained system 20, is employed, a local sense antenna 17 is used to sample outputs of the transmit antenna elements which are fed back to the processor 18 which computes the corrective weighting coefficients. The self-contained system 20 constitutes a closed loop system 20 with no human intervention, in that the error measurements directly control the corrections. Such a closed loop system 20 may also be implemented with a remote earth station as well as the onboard local sense antenna 17. Similarly, a local signal source, is used in the closed loop system 20 to provide a calibration signal that is processed through the receive antenna 22 to the processor 18 which computes the corrective weighting coefficients for the receive path.

Figure 2:
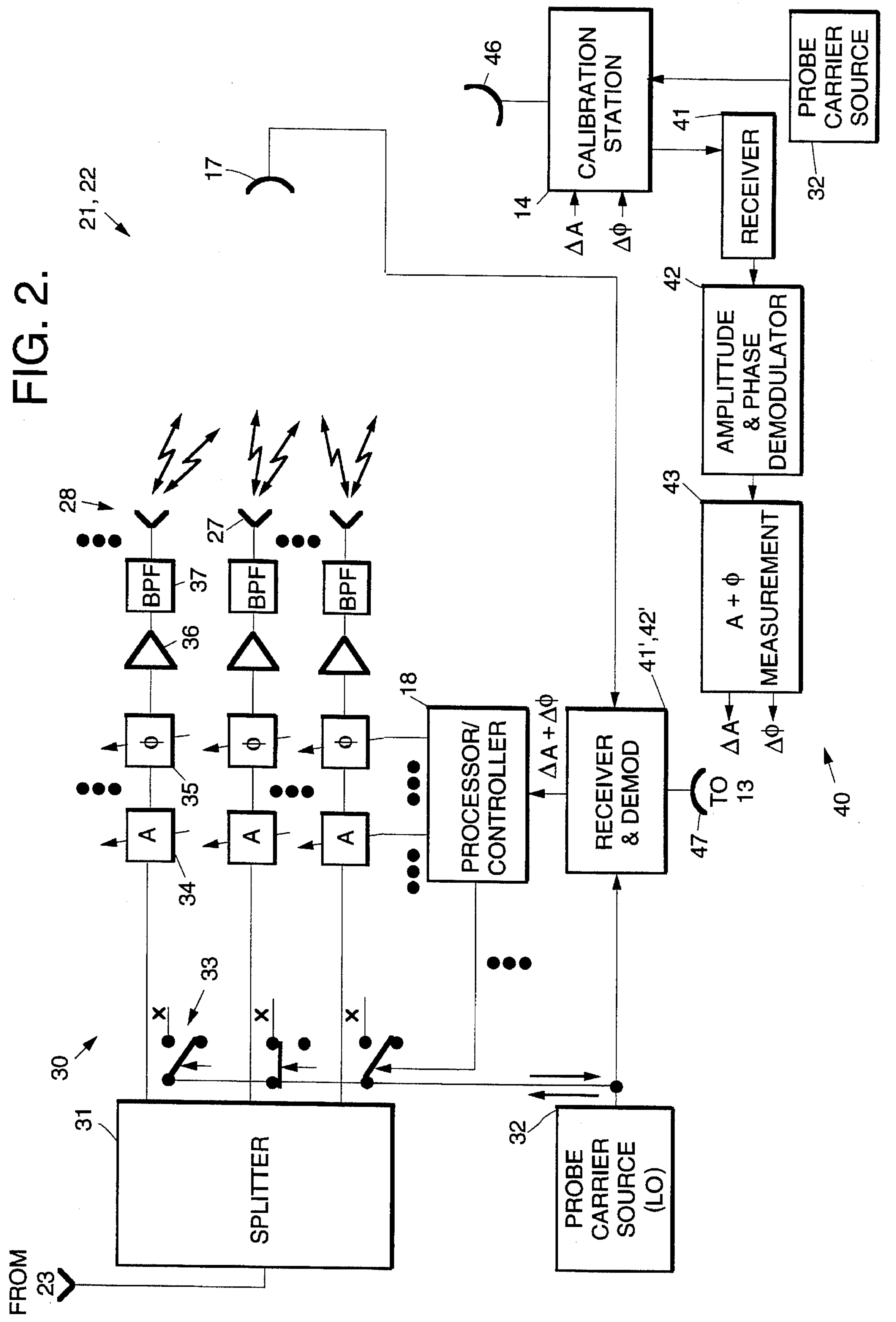
FIG. 2 illustrates details of the transmit phased array antenna and the operation of the phased array antenna management system of FIG. 1.

FIG. 2 shows details of the transmit and receive phased array antennas 21, 22 and illustrates the operation of phased array antenna management systems 20 of the present invention. The transmit and receive phased array antennas 21, 22 are comprised of a power splitter 31 having an input coupled to receive signals by way of the feeder antenna 23 and whose outputs are coupled through a plurality of element chains 30 of the transmit phased array antenna 21 to the respective antenna elements 28 thereof. Each chain 30 is comprised of a commutator switch 33, amplitude adjustment network 34, phase adjustment network 35, an amplifier 36 and a band-pass filter 37 that are coupled to the respective antenna elements 28. A probe carrier source 32, such as an oscillator 32, for example, is coupled to each switch and is employed to generate a probe carrier used to implement antenna calibration performed by the phased array antenna management system 20. The processor 18, which also functions as a controller 18, is coupled to the commutator switch 33, amplitude adjustment network 34, and phase adjustment network 35 of each chain in order to perform a phased array beam forming function provided by the phased array antenna management system 20. The processor 18, or controller 18, is coupled to a receiver and demodulator 41', 42' that are coupled to an antenna 47. The processor 18, or controller 18, is also used to apply corrective weighting coefficients to the amplitude and phase adjustment networks 34, 35 to calibrate the receive phased array antenna 22 during this phase of calibration.

The phased array antenna management system 20 provides for separate calibration of the forward and return link phased arrays antennas 21, 22. In each case a center element 27, for example, of each antenna 21, 22 is designated as a reference element 27. It is to be understood that the "center element" need not be a center element of the antenna in a physical sense. In the forward direction, a small unmodulated probe carrier generated by the probe carrier oscillator 32 is alternately radiated from the reference element 27 and a second element 28 under test. The probe carrier is generated and alternately applied to the drive signals for each element 27, 28 using the digital processor 18. The respective probe carrier signals are transmitted by way of the mobile communications link 15 to the calibration station 14.

The calibration station 14 comprises processing means 40 for determining the amplitude and phase produced by each chain 30 of the transmit and receive phased array antennas 21, 22 in response to the probe carrier signal. The processing means 40 comprises an antenna 46, a receiver 41, amplitude and phase demodulator 42, and amplitude and phase measurement circuitry 43 for generating amplitude and phase corrective weighting coefficients $\Delta A$ $\Delta\phi$. The calibration station 14 also comprises a probe carrier source 32, such as a local oscillator that is modulated by a code generator, for example, for generating probe carrier signals. Alternatively, respective probe carrier signals are transmitted to the antenna 17 whose output is fed back by way of the receiver 41' and demodulator 42' (substantially the same as the receiver 41 and demodulator 42 at the calibration station 14) to the processor 18 for computation and/or application of corrective weighting coefficients to the respective antenna element chains 30.

When the probe carder transmitted by the reference element 27 and element 28 under test is received at the calibration station 14, the phase and amplitude of the two signals are compared. Repeating this process for each of the elements 28 of the transmit phased array antenna 21 provides a map of the differential amplitudes and phases of each element 28 thereof. Calibration of the transmit phased array antenna 21 is performed in well under two minutes.

In the return direction, the process is reversed. A small unmodulated S band probe carrier is radiated from the calibration station 14. The S band probe carrier is received by all of the array elements 28 of the receive phased array antenna 22, but only two elements 28 are alternately sampled to form a calibration carrier. The calibration carrier is downlinked at Ka band to the gateway hub station 13 where their amplitudes and phases are compared. The probe carrier is sufficiently small (narrow bandwidth, low power, or encoded, etc.) so that it does not create unacceptable interference with normal communications traffic communicated by the system 10.

Optimum performance of the transmit and receive phased array antennal 21, 22 requires that each of the array element paths or chains 30 provide the proper phase and amplitude weighted signals. While each of the components of the element chains 30 is designed and implemented to provide transfer function stability over the lifetime of a mission, periodic recalibration of the phased array antennas 21, 22 using the principles of the present invention insures peak performance. In addition, failures of any element chain 30 are quickly detected and accurately characterized to permit remedial action, if necessary. The performance of these measurements do not interrupt the normal flow of communication signals by the system 10.

The following description describes a specific system link budget for a system that uses digital processing. It is to be understood that this is an example for illustrative purposes only, and is not to be considered as generic for all systems.

The measurement accuracy of the phased array antenna management system 20 is determined by the signal to noise ratio and the measurement averaging time. For a typical system, by reducing the measurement bandwidth to 100 Hz, good accuracy and measurement speed is attained without undue system resource demands, as is illustrated with reference to Tables 1 and 2.

TABLE 1

PERFORMANCE BUDGET
HYPOTHETICAL MOBILE SATELLITE SYSTEM
[Forward Direction]

| | Center [REF] Element | Edge Element |
|---|---|---|
| RF element power [272 RF Watt array total] | +42 dBm | +25 dBm |
| Element antenna gain | +12 dB | +12 dB |
| Element EIRP | +54 dBm | +37 dBm |
| Path loss [10,600 KM, f = 2 GHz] | −179 dB | −179 dB |
| Receive earth terminal G/T [10' Dia., 100° K.] | +13 dB/°K. | +13 dB/°K. |
| C/T | −142 dBW/K | −159 dBW/K |
| C/N [1 Hz BW] | +86.6 dB Hz | +69.6 dB Hz |
| If probe carrier is −10 dB relative to edge element power: C/N [100 Hz] | +39.6 dB | +39.6 dB |
| The 1 sigma amplitude accuracy is: 20 Log[1 + 0.707 * 10^ − (C/N/20)] | 0.09 dB | 0.09 dB |
| The 1 sigma phase accuracy is: Arctangent [0.707 * 10^ − (C/N/20)] | 0.6 Deg | 0.6 Deg |
| Time for single element measurement | 50 mSec | 50 mSec |

TABLE 2

PERFORMANCE BUDGET
HYPOTHETICAL MOBILE SATELLITE SYSTEM
[Return Direction]

| | Center [REF] Element | Edge Element |
|---|---|---|
| Earth terminal transmit power | −15 dBm | −15 dBm |
| Earth terminal antenna gain | +33 dB | +33 dB |
| Terminal EIRP | +18 dBm | +18 dBm |
| Path loss [10,600 KM, f = 2 GHz] | −179 dB | −179 dB |
| Array element G/T [12 dB gain, T = 67 Deg] | −6.3 dB/°K. | −6.3 dB/°K. |
| C/T | −163 dBW/K | −163 dBW/K |
| C/N [1 Hz BW] | +61.3 dB Hz | +61.3 dB Hz |
| C/N [100 Hz BW] | +41.3 dB | +41.3 dB |
| The 1 sigma amplitude accuracy is: 20 Log[1 + 0.707 * 10^ − (C/N/20)] | 0.05 dB | 0.05 dB |

TABLE 2-continued

PERFORMANCE BUDGET
HYPOTHETICAL MOBILE SATELLITE SYSTEM
[Return Direction]

| | Center [REF] Element | Edge Element |
|---|---|---|
| The 1 sigma phase accuracy is: | | |
| Arctangent [0.707 * 10^ – (C/N/20)] | 0.35 Deg | 0.35 Deg |
| Time for single element measurement | 50 mSec | 50 mSec |

In the forward direction, antenna element chain 30 calibration is performed by alternately injecting the probe carrier onto the reference element 27 and the element 28 under test. The probe carrier is thus radiated from alternating elements of the phased array antenna 21 and received at the calibration station 14 as a TDM signal. In the return direction, the calibration process is reversed. The probe carrier radiated from the calibration station 14 is received by all of the elements 28 in the receive phased array antenna 22. The received signal from the reference element 27 and the element 28 under test is alternately sampled in the processor 18, and the resulting waveform constructs a narrow band calibration carrier. This carrier is downlinked to the gateway hub station 13 on the gateway communications link 16. Demodulation at the calibration station 14 provides calibration parameters. For forward link calibration, the probe carrier, represented by digitally encoded samples, is generated in the processor 18. The probe carrier samples are digitally added to the communications signal bit stream destined for a single array element 28. A subsequent digital to analog conversion process creates an analog version of the probe carrier along with the normal communication signals for that element 28. The probe carrier is alternated between elements 27, 28 by switching the probe samples between their respective element adders.

In the return direction, the unmodulated S-band carrier is radiated from the calibration station 14. The received probe carrier is alternately selected from the reference element 27 and the element 28 under test. The bit stream resulting from the analog to digital conversion process on each array element 28 includes the ground originated probe signal. The bit stream from each of the elements 28 is selected by the commutator switch 33 to create a time-multiplexed bit stream. This bit stream, after digital to analog conversion, serves as the return direction calibration probe carrier. The switched waveform is downlinked to the calibration station 14 for comparative measurement. After downlinking, the probe carrier signal is filtered out of the calibration carrier using a 100 Hz bandwidth filter, for example. Once the differential amplitude and phase of each of the elements has been measured, a computational comparison with the desired amplitude and phase distribution is performed at the gateway hub station 13. The amplitude and phase weighting networks 34, 35 under control of the processor 18 are commanded to values that compensate for the measured errors.

Figure 3:
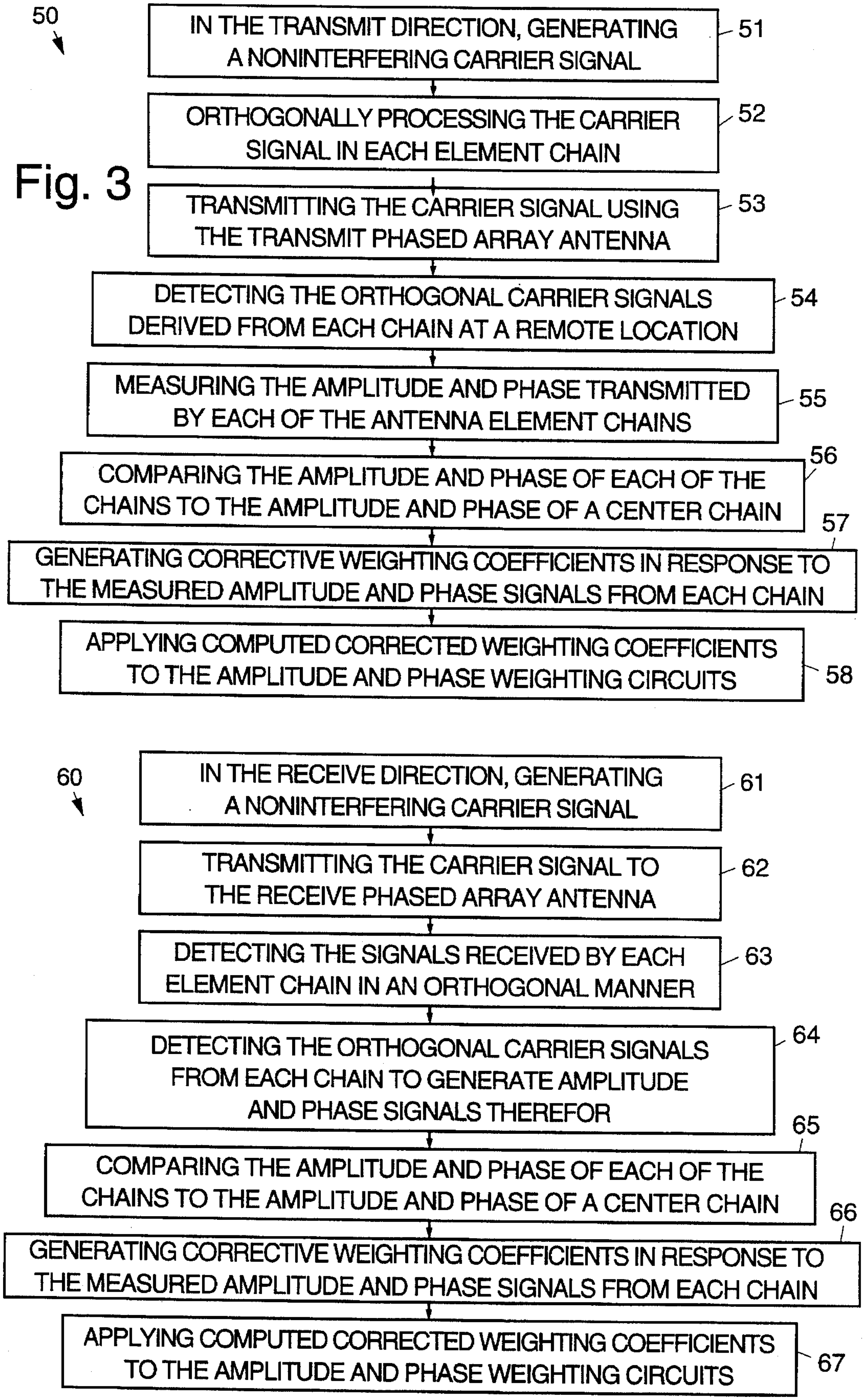
FIG. 3 is a flow diagram that illustrates a calibration method in accordance with the principles of the present invention.

The calibration method 50 in accordance with the present invention will be more clearly understood with reference to FIG. 3 which is a flow diagram illustrating a calibration method 50 in accordance with the principles of the present invention. The calibration method 50 comprises the following steps. In the transmit direction, a noninterfering and preferably nonburdening carrier signal is generated, indicated by step 51. Each element chain processes the carrier in an orthogonal manner, whereby the signals processed by each chain are sequentially processed in time, or frequency, or have distinct orthogonal codes so that each chain is distinguishable, indicated by step 52. The carrier signal is transmitted by the transmit phased array antenna 21, indicated by step 53. The orthogonal carrier signals derived from each chain are then detected at a remote location, indicated by step 54. The remote location may be the calibration station 14 or the local antenna 17 located disposed on the satellite 12. The amplitude and phase transmitted by each of the antenna element chains is then measured, indicated by step 55. The amplitude and phase of each of the chains is compared to the amplitude and phase of a center chain, indicated by step 56. Corrective weighting coefficients are then generated in response to the measured amplitude and phase signals derived from each of the chains, indicated by step 57. Once the corrected weighting coefficients have been computed, they are applied to the amplitude and phase weighting circuits 34, 35 the controller 18, indicated by step 58.

In the receive direction, a noninterfering and preferably nonburdening carrier signal is generated at either on the satellite 12 or at the calibration station 14, indicated by step 61. The carrier signal is transmitted to the receive phased array antenna 22, indicated by step 62. The signals that are received and processed by each element chain are detected in an orthogonal manner, whereby the signals derived from each chain are sequentially processed in time, or frequency, or have distinct orthogonal codes so that each chain is distinguishable, indicated by step 63. The orthogonal carrier signals derived from each chain are then detected to generate amplitude and phase signals for each chain, indicated by step 64. The amplitude and phase of each of the chains is compared to the amplitude and phase of a center chain, indicated by step 65. Corrective weighting coefficients are then generated in response to the measured amplitude and phase signals derived from each of the chains, indicated by step 66. Once the corrected weighting coefficients have been computed, they are applied to the amplitude and phase weighting circuits 34, 35 by the controller 18, indicated by step 67.

In general, the amplitude and phase signals associated with the chains have a known relationship with respect to each other, and if they do not, as determined by the measured amplitude and phase data derived from processing the calibration signals, then corrective weighting coefficients are generated to correct the outputs of the chains. The corrective weighting coefficients may be used to correct for drift or for catastrophic failure of any of the chains. In the case of drift, offsets are generated that correct chains whose amplitude and phase are not at their proper values. In the case of failure of a chain, the balance of the chains are reconfigured by adjusting each of the amplitudes and phases thereof to generate a desired beam profile from the transmit phased array antenna 21. The weighting may be accomplished by adjusting physical circuits, such as the amplitude and phase weighting circuits 34, 35, or by applying mathematical coefficients that are applied in software, for example, such as in the processor 18, in a manner generally well known in the art. The calibration method 50 may be employed on a continuous basis or infrequently, depending upon the system 10 in which it is used. Computation of the correction coefficients may be performed at a remote location, such as the calibration station 14, where human operators determine the commanded correction coefficients, or on the satellite 12 using a closed-loop feedback path between the local antenna 17 and each of the antenna element chains.

Thus there has been described a new and improved management system and antenna calibration method for use with a phased array communication system that uses the system to solve component problems occurring in the transmit and receive antenna arrays. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A phased array antenna management system for use with a phased array communication system comprising transmit and receive phased array antennas that each include a plurality of antenna element chains, wherein each chain comprises an amplitude adjustment network, a phase adjustment network, an amplifier, a filter, and an antenna element, and wherein each chain has a desired amplitude and phase relationship with respect to the other chains of its respective antenna, said system comprising:

a probe carrier source for generating a noninterfering probe carrier signal that is processed by each antenna element chain;

means for determining the amplitude and phase produced by each chain of the transmit and receive phased array antennas in response to the probe carrier signal, for comparing the amplitude and phase produced by each chain to the desired amplitude and phase for each chain, for determining which antenna chains do not have the desired amplitude and phase relationship therebetween, and for generating corrective weighting coefficients for chains that do not have the desired amplitude and phase; and means for applying the corrective weighting coefficients to the amplitude and phase adjustment networks of each chain of the transmit and receive phased array antennas to produce the desired amplitude and phase relationship therebetween.

2. The phased array antenna management system of claim 1 wherein the probe carrier source comprises a commutator switch for sequentially processing the probe carrier signal through each antenna element chain.

3. The phased array antenna management system of claim 1 wherein the probe carrier source comprises a signal source modulated by a code generator for generating orthogonal probe carrier signals for processing by each antenna element chain.

4. The phased array antenna management system of claim 1 wherein the means for determining the amplitude and phase produced by each chain comprises:

a calibration station remotely located from the transmit and receive phased array antennas that comprises an antenna, a receiver, and amplitude and phase determining means for detecting the amplitude and phase produced by each chain; and a communications link coupled between the transmit and receive phased array antennas and the calibration station.

5. The phased array antenna management system of claim 1 wherein the means for determining the amplitude and phase produced by each chain comprises a local antenna, a receiver, and amplitude and phase determining means for detecting the amplitude and phase produced by each chain.

6. A method of calibrating transmit and receive phased array antennas of a phased array communication system, wherein respective antenna element chains comprising each of the antennas have a desired amplitude and phase relationship with respect to signals processed thereby, said method comprising the steps of:

processing noninterfering probe carrier signals through each antenna chain of the transmit and receive antennas;

comparing the respective phases and amplitudes of the processed probe carrier signals to provide a map of differential amplitudes and phases of each antenna chain of the respective transmit and receive antennas;

determining which antenna chains do not have the desired amplitude and phase relationship between the probe carrier signals processed thereby;

generating corrective weighting coefficients for the antenna chains that do not have the desired amplitude and phase relationship between the probe carrier signals processed thereby; and applying the corrective weighting coefficients to each chain of the transmit and receive antennas to produce the desired amplitude and phase relationship between signals processed thereby.

* * * * *